Feb. 16, 1960 H. L. EASTUS 2,925,183
PNEUMATIC TAKE-OUT APPARATUS FOR GLASSWARE
Filed May 15, 1958 3 Sheets-Sheet 1

INVENTOR.
HAROLD L. EASTUS
BY W. A. Schaich &
E. J. Holler
ATTORNEYS

INVENTOR.
HAROLD L. EASTUS

Feb. 16, 1960 H. L. EASTUS 2,925,183
PNEUMATIC TAKE-OUT APPARATUS FOR GLASSWARE
Filed May 15, 1958 3 Sheets-Sheet 3
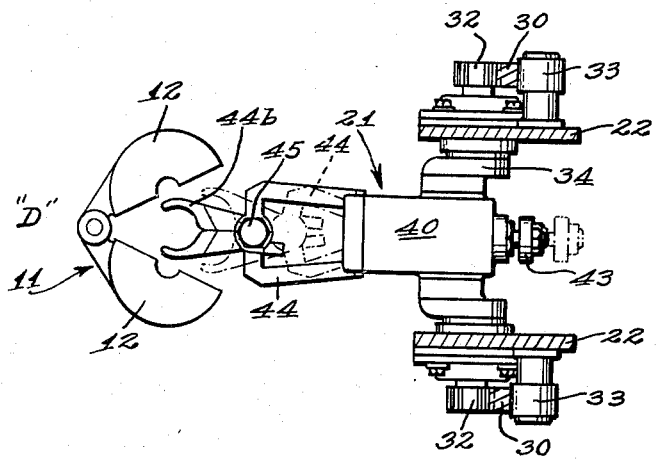
Fig. 3
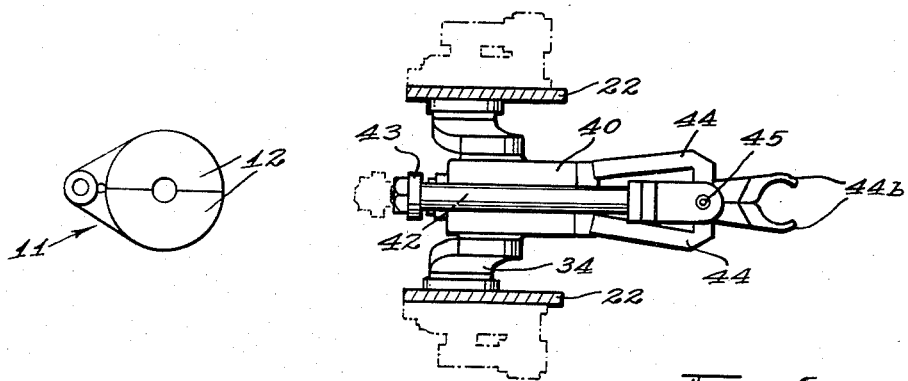
Fig. 4
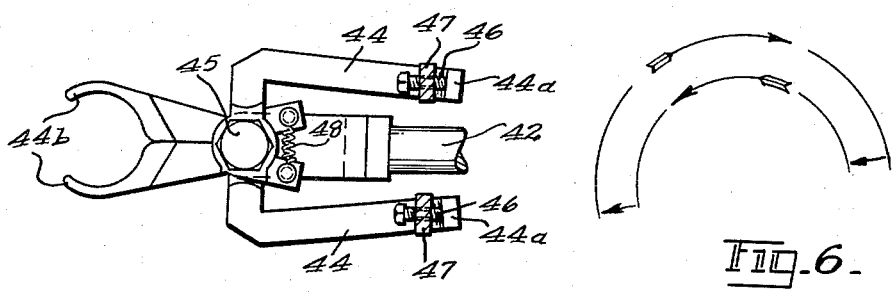
Fig. 5
Fig. 6
INVENTOR.
HAROLD L. EASTUS
BY W. A. Schaich &
E. J. Holler
ATTORNEYS

United States Patent Office 2,925,183
Patented Feb. 16, 1960

2,925,183

PNEUMATIC TAKE-OUT APPARATUS FOR GLASSWARE

Harold L. Eastus, Muncie, Ind., assignor to Kimble Glass Company, a corporation of Ohio Application May 15, 1958, Serial No. 735,531

7 Claims. (Cl. 214—1)

The present invention relates to glass handling apparatus and more particularly to a mechanism for utilization with glassware forming machines for automatically transferring newly-formed ware from a mold of such machine. Such mechanism is commonly referred to as a take-out mechanism.

The subject automatic take-out mechanism is especially applicable for use in connection wtih forming machines for removing irregularly shaped articles, as for example glass power line insulators having grooved or necked portions, from the molds in which they are formed and for transferring them to an adjacent surface in an inverted position. The mechanism for handling glassware or other articles as hereinafter shown and described is employed for transferring and inverting glassware, the ware being transferred from the take-out position of a forming machine onto an adjacent supporting plate from which it is usually moved onto a conveyor and carried into an annealing or tempering lehr.

Previously, in the handling of glass articles such as bell-shaped power line insulators, particularly in removing the hot semi-plastic insulators from their forming molds, a pair of separable jaw members has been utilized which descend directly on an upwardly facing cup-shaped insulator in the mold and close upon the necked body portion of the insulator from opposite sides thereof for its firm engagement. To secure proper handling of insulators of considerable size and weight considerable pressure must be exerted onto insulator sides by the jaws. Because the glass of the bell-shaped wall portions is not fully hardened, the insulator cannot be grasped in its greatest cross-sectional area otherwise deformation of the insulator skirt area would result. It is necessary that the jaws of any take-out apparatus avoid conflict with the mold and the deformable sidewall portions of the freshly-formed insulator, only the body portion having the least cross-sectional area being readily available for firm engagement and transfer of the article without deformation.

Accordingly, it is an object of this invention to provide an improved take-out apparatus for transferring articles from one point to another, said device having grasping jaws adapted to combined oscillatory and reciprocatory movement to engage the article to be transferred, the jaws being able to properly clear the mold to positively engage the article at a body portion for the take-out operation.

Another object of the present invention is to provide efficient automatic apparatus for transferring articles of glassware from their open molds while the glass is still in a plastic state by retaining each of the articles at a grooved body portion and depositing it on an adjacent supporting surface in an inverted position for their conveyance to subsequent operations.

Another object of the invention is to provide pneumatic handling apparatus for newly-formed glass articles for their automatic removal from molds of a molding machine, the semi-plastic articles being maintained in shape during handling to permit their final set in finished form precisely as molded.

Another object of the invention is to provide glassware handling apparatus having grasping jaws which are oscillatable in a semi-circular pattern in a retracted open position in one direction and in an extended closed ware-grasping position in the opposite direction to facilitate the removal of newly-formed articles from their forming molds and transference to an adjacent supporting surface.

A still further object of the present invention is to provide novel take-out apparatus adapted for use with a press molding machine having molds arranged in an annular series, which apparatus provides a pair of scissor-type ware gripping jaws capable of both reciprocating lateral and arcuate vertical movement through an angle of essentially 180° between loading and unloading positions in timed synchronism with the forming machine.

The specific nature of this invention, as well as other objects and advantages thereof, will become apparent to those skilled in the art from the following detailed description, taken in conjunction with the annexed sheets of drawings on which, by way of preferred example only, are illustrated the preferred embodiments of this invention.

On the accompanying drawings:

Fig. 3 is a horizontal sectional view taken along the line 3—3 of Fig. 1 showing the grasping jaws in closed article grasping position in full lines and in adjacent opened position in broken lines.

Fig. 4 is a view similar to Fig. 3 showing the take-out jaws after oscillation through a vertical plane to a point of deposition opposite the forming mold.

Fig. 5 is an enlarged plan view partly in section of the grasping jaw structure of the apparatus.

Fig. 6 is a diagrammatic view illustrating the lateral and arcuate paths of the gripping jaws between loading and unloading positions of the apparatus.

Figure 1:
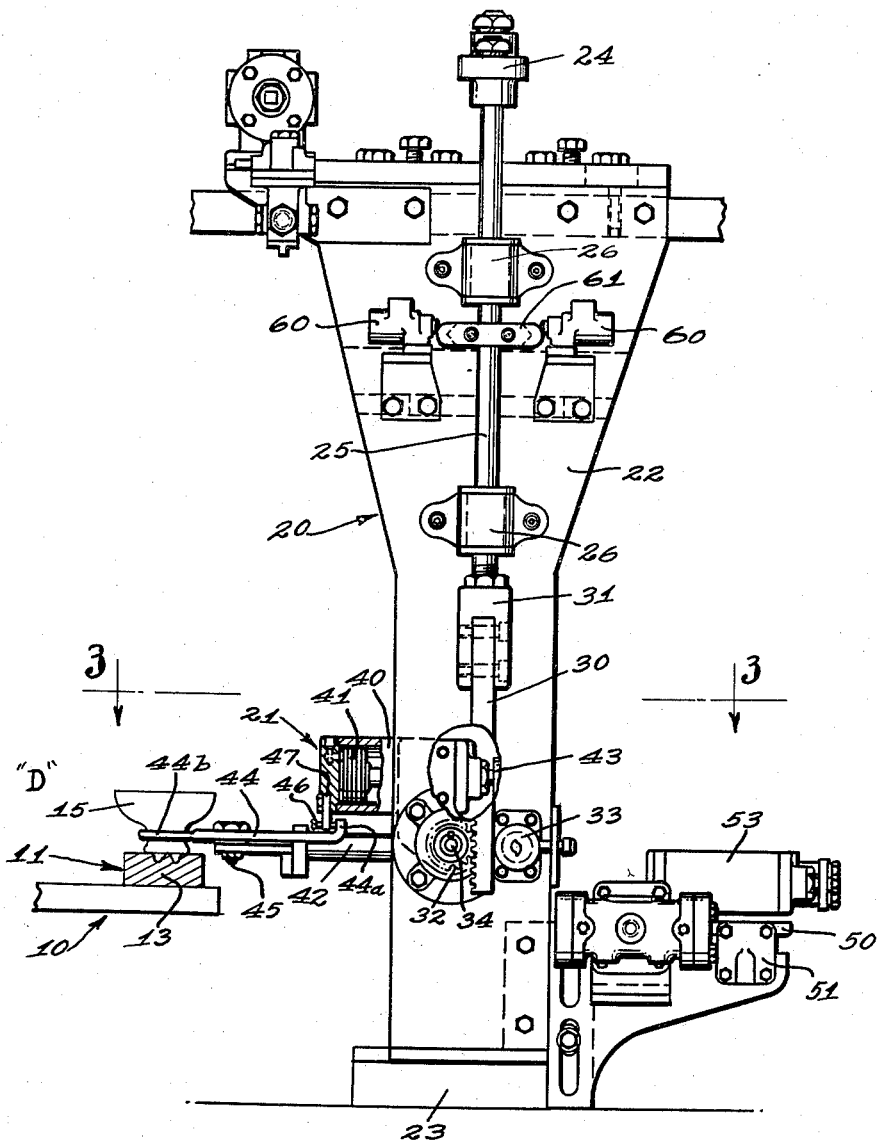
Fig. 1 is a side elevational view of the take-out apparatus, partially in section and partially cut away, illustrating one embodiment of the invention with the grasping jaws engaging an article of the class described for its transference and inversion by the apparatus.

Referring now to Fig. 1, a portion of a conventional rotary or turret-type glass insulator forming machine is shown at 10 and includes a rotary mold table adapted to rotate about a stationary vertical column. An annular series of similar mold groups or units 11 is mounted in spaced relationship on the mold table. The mold units 11 each include partible mold halves 12 (Figs. 3 and 4) and a bottom plate 13 therefor (Fig. 1) adapted to form the sidewall surfaces and lower body portion respectively of a glass insulator 15, for example. At the discharge station "D" of the forming machine 10 the partible mold halves 12 are swung into open relationship and glass insulator 15 rests on mold bottom plate 13 between the mold halves for removal therefrom.

The mold table is adapted to be indexed periodically to bring the mold units 11 in succession through the various operating stations of the machine and finally to discharge station "D" as shown in Figs. 1 and 3. The insulators 15 which are formed by the machine may be generally circular in shape having the bell-shaped contour shown in Fig. 1. The insulator may also have a threaded pin receiving opening in a central portion thereof for its mounting on a cross member of an electric pole in power line bearing relationship. The threaded opening is usually surrounded by the bell or skirt portion which normally faces upwardly in molding arrangement.

Briefly, the article handling or take-out apparatus 20 comprises a combined grasping and oscillating mechanism 21 which is rotatable through essentially an angle of about 180° from loading to unloading positions of the apparatus. The take-out apparatus 20 has a rigid hollow frame including a pair of spaced upright members 22 mounted upon a base 23 disposed adjacent the forming machine 10.

An operable crosshead 24 is mounted on upright members 22 having downwardly extending arm portions 25 which are arranged exteriorly and parallel to upright members 22. Each of the arm portions 25 constitute vertically operable shafts or rods journalled within several lineal bearings 26 fixed to the exterior surfaces of upright members 22.

An air piston motor 27 (Fig. 2) is mounted between upper portions of upright members 22 having a piston 28 and an upwardly extending piston rod 29, the latter being connected to a medial portion of crosshead 24 for its up-and-down movement. Motor 27 effects the turnover motion of oscillating mechanism 21.

Figure 2:
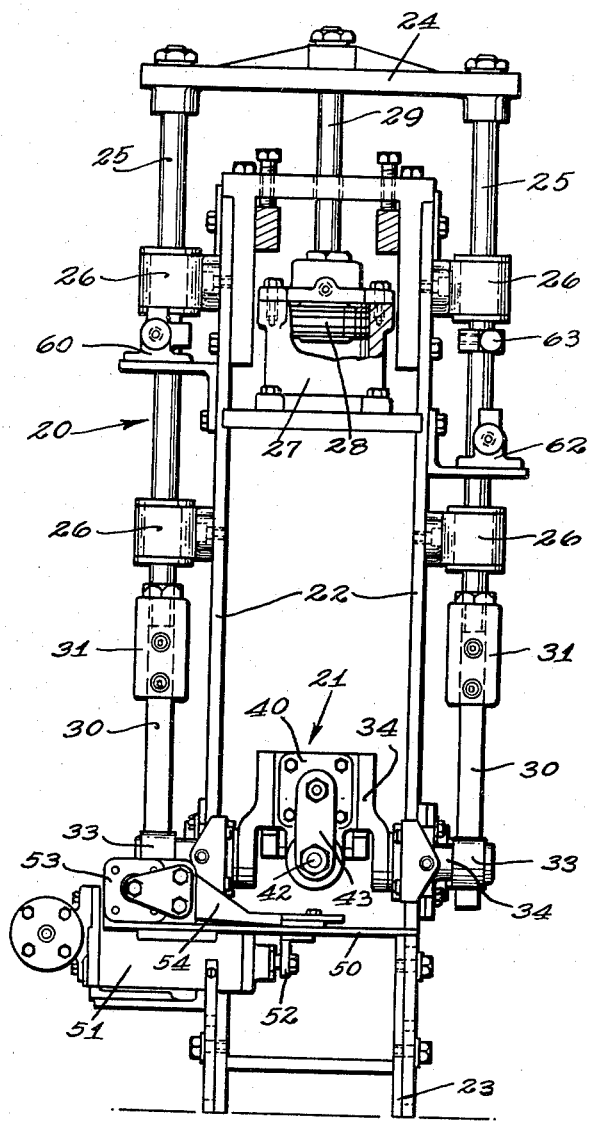
Fig. 2 is a front elevational view of the take-out apparatus with its gripping jaws illustrated in the article grasping position as shown in Fig. 1.

The lower extremities of crosshead arm portions 25 are each connected to a lineal rack 30 by means of adjustable connectors 31. Each rack 30 operates in mesh with a pinion 32 and is maintained in alignment therewith by a back-up block 33. As shown in Figs. 1 and 2, oscillatable carriage mechanism 21 is mounted between upright members 22 having a rocker arm shaft 34 with its outwardly extending end portions journalled therein. Pinion members 32 are connected to the ends of rock shaft 34 exteriorly of frame members 22. Carriage 21 has an air motor 40 mounted thereon with an operable piston 41 extending in horizontal relationship parallel to the carriage body. Flexible inlet and outlet lines (not shown) are connected to air motor 40 to supply and exhaust pressurized air to and from both sides of piston 41. A laterally operable rod member 42 is mounted on the carriage perpendicular to and within rock shaft 34 coaxially with cylinder 41. One end of rod 42 is connected to the piston shaft by an end plate member 43 and the other end is connected to the gripping arms 44.

Grasping device 21 has a pair of gripper arms 44 of the scissors-type mounted in pivoted relationship at a projecting end of rod 42. Gripping arms 44 are mounted on pin 45 for their pivotal movement thereabout into engaging and disengaging relationship with respect to insulator 15. Each gripping arm 44 is provided with an upwardly extending flange portion 44a which is adapted to contact an adjustable stop member 46 carried by a fixed portion 47 attached to one end of the carriage cylinder 40. A tension spring 48 (Fig. 5) is utilized to maintain the jaw portions 44b in the opened position at all times except during their full extension, namely, when flange portions 44a contact stop members 46. During the last increment of travel of arms 44 by extension of rod 42, jaws 44b are pivotally closed to positively grasp the insulator 15.

A horizontal support plate 50 which is commonly referred to as a "dead plate" is attached to upright members 22 on the opposite side thereof from the forming machine 10. An air cylinder motor 51 is mounted beneath dead plate 50 having a pusher bar 52 adapted to reciprocally operate beneath the lower surface of the support plate. Plate 50 may be provided with a slot-type opening extending from its central region to its right hand perimeter, as shown in Fig. 2, so that pusher bar 52 may reject an insulator 15 having a thread forming element remaining therein following its discharge from the forming machine. Such thread forming element when carried by the insulator would project downwardly through the slot and be contacted by bar 52 for elimination of a rejectable insulator.

Another air cylinder motor 53 is provided on the upper surface of dead plate 50 having a pusher bar 54 which reciprocally operates across the upper surface of the plate from left-to-right in Fig. 1 perpendicular to lower reject bar 52. Pusher bar 54 is adapted to move each insulator 15 from support plate 50 onto an adjacent cooling table, transfer conveyor or lehr belt, as desired, for subsequent annealing or tampering.

Operation of the take-out apparatus may be summarized as follows:

When insulator 15 arrives at the discharge station "D" of the forming machine 10, partible mold halves 12 swing open leaving the insulator resting on its mold bottom plate 13 in suitable take-out arrangement. Crosshead 24 is operated upwardly by turnover motor 27 with meshing rack and pinion members 30 and 32 effecting angular rotation of carriage 21 through approximately a 180° angle. At this time air cylinder 40 has its piston 41 in an extreme right-hand position (oppositely disposed from that shown in Fig. 1) so that gripping arms 44 are in their retracted open position. On arrival of carriage 21 in the horizontal loading position shown in Fig. 1, piston 41 is moved from right-to-left by compressed air projecting take-out arms 44 from their open position (as shown in broken lines in Fig. 3) to their fully extended closed arrangement with respect to insulator 15 (as shown in Figs. 1 and 3). During latter stages of projection of gripping arms 44, i.e., while they are laterally moved the last 1/16 to 1/8 inch, their flanges 44a are contacted by stop members 46 and pivotal movement of the arms is effected about pivot pin 45 against tension member 48. Gripping arms 44 being of the scissors-type are then closed so that their arcuately-curved jaw portions 44b then contact the grooved portion of insulator 15. Upon firm grasping of the insulator it is swung upwardly by carriage 21 through a semi-circular arc of approximately 180° to support plate 50 with the take-out arms 44 then being in the unloading position as illustrated in Fig. 4. Gripping arms 44 are swung outwardly in their extended closed arrangement with cylinder 40 and piston 41 exerting a positive gripping force upon the article by jaws 44b. The arms may be swung arcuately quite fast without disengagement of even relatively heavy insulators so that each is brought to an unloading position on supporting plate 50. With the insulator 15 resting on plate 50, gripping arms 44 are then retracted by lateral movement right-to-left of cylinder piston 41 which disengages the jaws 44b from the article. In this retracted open position the gripping jaws 44 are again available for cyclic oscillatory and reciprocatory movement to transfer the next article.

The vertical movement of crosshead 44 and its connecting rods 25 may be governed by limit switches to control the pressurized air flow to and from air motor 27 and thus the angle of rotation of the gripping arms. A pair of limit switches 60 as shown in Fig. 1 are disposed in fixed relationship on opposite sides of a contact bar 61 attached to one operable rod 25. The position of bar 61 controls the upper limit of crosshead 24 and the loading position of arms 44. The lowermost position of crosshead 24 and the unloading position of arms 44 may be governed by another pair of limit switches 62 and a similar stop member 63 (Fig. 2) attached to the other crosshead arm portion 25.

By proper arrangement of stop members 61 and 63 and their operative switches 60 and 62 respectively, vertical movement of crosshead 24 by air piston motor 27 may be arranged to effect oscillatory motion of carriage 21 through an angle of about 180° to loading and unloading positions in a horizontal or near horizontal plane. In Fig. 6 the lateral and arcuate cyclic path of the gripping jaws is shown schematically moving from right-to-left in their retracted open position and from left-to-right in their extended closed position for transferring the ware.

Various modifications may be resorted to within the spirit and scope of the appended claims.

I claim:

1. Apparatus for transferring glassware, including a support frame having a pair of spaced upright members, a U-shaped crosshead having downwardly projecting arms mounted on said upright members, an oscillatory carriage mounted on a rockshaft in pivotal relationship between said upright members, a pair of scissors-type gripping arms disposed on said carriage adapted to engage and transport an article of glassware, means carried by said carriage adapted to move said gripping arms laterally with respect to said carriage into extended and retracted positions and pivotally with respect to each other near said extended position, a pair of individual rack and pinion members interconnecting said carriage and the downwardly projecting arms of said crosshead, and means adapted to move said crosshead in a vertical direction and thereby effect pivotal oscillation of said carriage and said gripping arms through an arcuate path.

2. Apparatus for transferring glassware, including a support frame having a pair of spaced upright parallel members, a U-shaped crosshead mounted on said upright members in an inverted position with its arm portions extending downwardly exteriorly of said upright members, an oscillatory carriage mounted in pivotal relationship between said upright members, a pair of gripping arms pivotable about a common axis carried by said carriage extending outwardly therefrom adapted to engage and transport an article of glassware, an air piston motor mounted on said carriage adapted to move said gripping arms both laterally with respect to said carriage and pivotally with respect to each other, individual rack and pinion members interconnecting each side of said carriage and one arm portion of said crosshead, and an air piston motor connected to said crosshead adapted to move the same in a vertical direction to thereby effect pivotal rotation of said carriage and its gripping arms through essentially a 180° angle.

3. The apparatus in accordance with claim 2, including a rock shaft extending from each side of said carriage journalled within said upright members with its ends carrying said pinion members.

4. The apparatus in accordance with claim 2, wherein said two gripping arms comprise scissor-type grasping fingers pivotally mounted on said carriage adapted to be laterally moved and pivotally closed at their extended position and opened at their retracted position by said piston motor mounted on said carriage.

5. The apparatus in accordance with claim 2, wherein said two gripping arms are normally maintained in the opened position by a tension member and are moved into closed relation by contacting a flange portion of said carriage during their projecting movement into an extended position.

6. A take-out apparatus for transferring and inverting glassware, including a support frame having a pair of spaced upright members, an inverted U-shaped crosshead mounted on said upright members with its arm portions extending downwardly adjacent to and exteriorly of said upright members, an oscillatory carriage mounted between said upright members, said carriage having a rockshaft journalled within and extending through an intermediate area of said upright members, two gripping arms pivotable about a common axis carried by said carriage extending outwardly therefrom adapted to engage and transport an article of glassware, an air piston motor mounted on said carriage adapted to move said gripping arms both laterally with respect to said carriage into projected and retracted positions and pivotally with respect to each other near said projected position for their opening and closing thereat, rack and pinion members interconnecting both ends of the rockshaft of said carriage and the arm portions of said crosshead, and an air piston motor mounted between said upright members and connected to said crosshead adapted to move said crosshead in up-and-down movement to thereby effect cyclic pivotal rotation of said carriage and its gripping arms through essentially a 180° angle.

7. The apparatus in accordance with claim 6, including timing means adapted to operate the air piston motor of said crosshead and the air piston motor of said gripping arms on said carriage in timed synchronism, the arms adapted to be angularly rotated through approximately 180° in one direction in their retracted open position and in the opposite direction in their extended closed position transporting the said article.

References Cited in the file of this patent
UNITED STATES PATENTS

| | | |
|---|---|---|
| 2,627,335 | Gedris | Feb. 3, 1953 |
| 2,781,136 | Sehn | Feb. 12, 1957 |
| 2,832,478 | Malewicz | Apr. 29, 1958 |